United States Patent Office 3,697,419
Patented Oct. 10, 1972

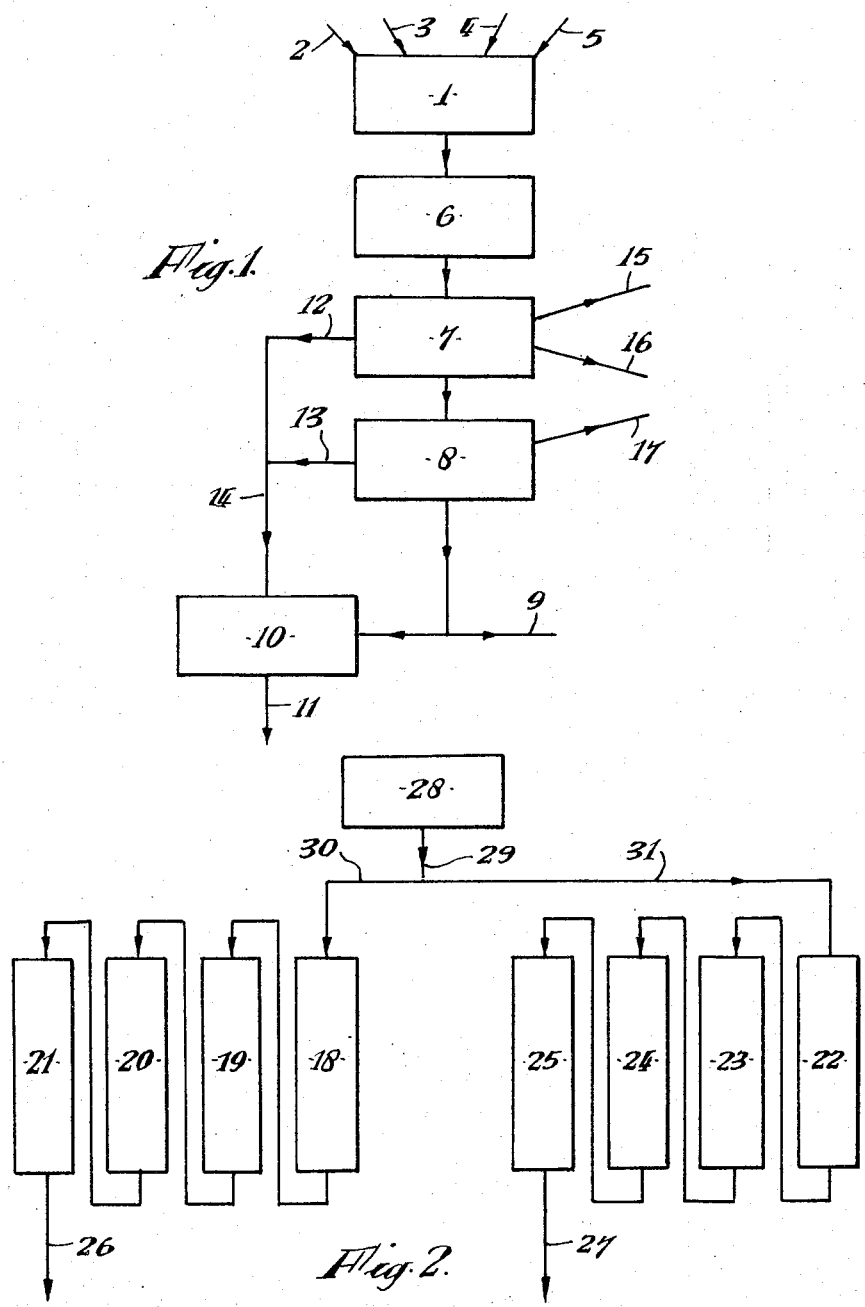

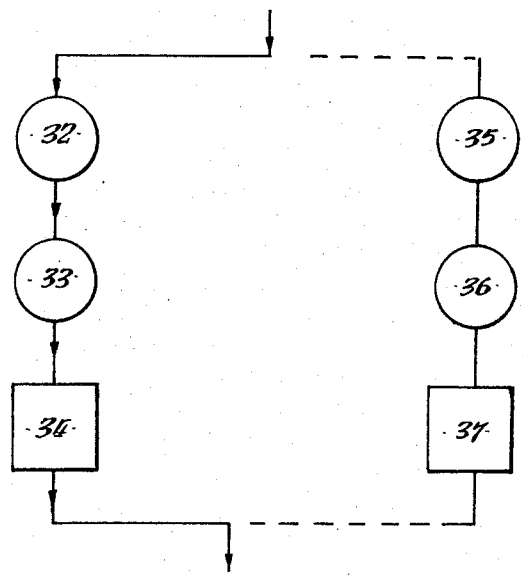
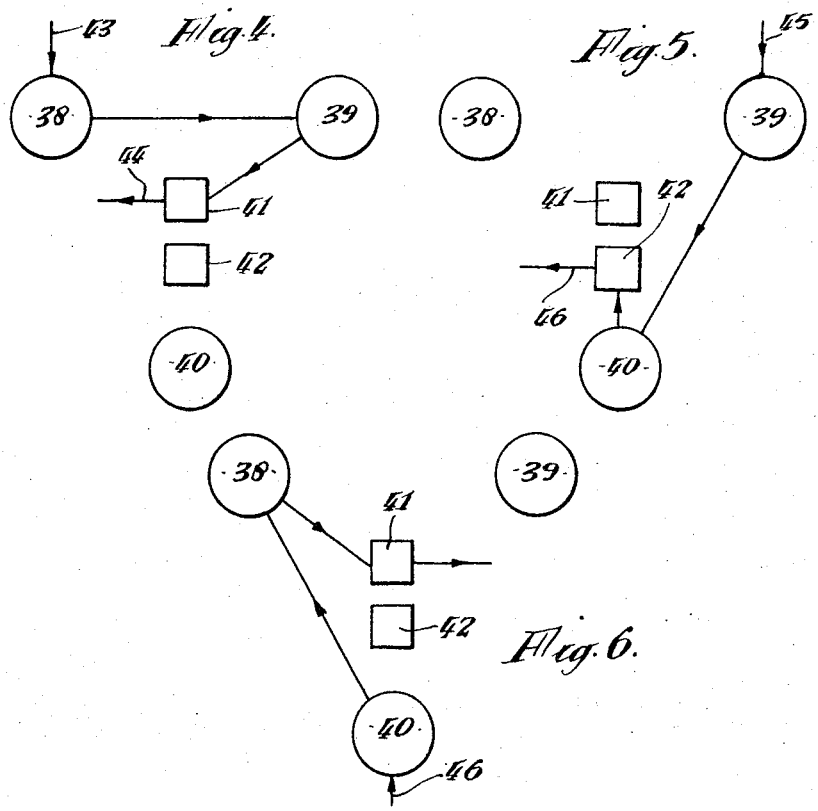

3,697,419
PROCESSES FOR THE PURIFICATION OF
WASTE EFFLUENT
Roy Arthur Grant, Great Shelford, Cambridge, England, assignor to Tasman Vaccine Laboratory Limited, Upper Hutt, New Zealand
Filed July 14, 1969, Ser. No. 841,430
The portion of the term of the patent subsequent to Mar. 30, 1988, has been disclaimed
Claims priority, application New Zealand, July 15, 1968, 153,129
Int. Cl. B01d 15/04
U.S. Cl. 210—27
2 Claims

ABSTRACT OF THE DISCLOSURE

The specification describes the use of a particulate ion exchange material for the purification of waste effluents, such as washings obtained from slaughter houses, which contain protein or fat, or both. The use of the material can provide effluent with a sufficiently low contamination level for it to be readily disposed of, or even reused for further cleaning purposes. By suitable elution of the material, the protein or fat can be released and isolated for use, for example, as animal food. The ion exchange material can be regenerated for reuse.

---

This invention relates to processes for the purification of waste effluent, and has been devised particularly, though not solely, for use in removing protein, and for use in abattoirs, meat works, and other effluent producing organisations.

Such effluent may vary in composition, but a typical effluent results from the use of large quantities of water for the washing of slaughter house equipment and carcasses, which effluent contains appreciable amounts of soluble protein, and suspended or colloidal protein material, together with a certain amount of particulate tissue fragments and fat.

At present, such effluents are often discharged with the proteins and other metabolic products still in the effluent, which has considerable disadvantages, resulting from loss of such products, and also from the fact that the effluent is not subsequently reusable, and tends to cause pollution.

According to this invention we provide a process for the purification of liquid waste effluents containing protein said process comprising the steps of passing the said effluent which has already been subjected to pre-treatment for at least partly removing solids and fat, through a bed of a particulate ion exchange material in the form of a cross-linked regenerated cellulose modified by the introduction of cationic or anionic exchange groups, which is capable of taking up at least the major portion of the remaining protein from the effluent, and subsequently regenerating the ion exchange material for use in a further cycle.

By "protein" we mean a material which may contain some protein breakdown products (i.e. amino acids and/or polypeptides), which would be present in such proteinaceous effluent, as well as the undegraded protein macromolecules.

The invention also comprises the recovery of protein from the relatively concentrated eluate obtained from the ion exchange material during it regeneration.

Preferably, the ion exchange material comprises a cross-linked regenerated cellulose (such as voscose) modified by the introduction of cationic or anionic exchange groups. The exchange groups may be capable of anion exchange, such as amino, alkylamino, guanidino and quaternary ammonium groups or capable of cation exchange, such as sulphonic acid, phosphate and carboxyl groups.

The cross-linking may be provided by aldehyde residues, such as formaldehyde residues, produced by treatment of the regenerated cellulose with an aldehyde under acid conditions. Alternatively the cross-linking may be achieved by treatment with epichlorhydrin under basic conditions or physically, by exposure of the cellulose to high intensity ionising radiation.

The preparation and properties of such ion exchange materials are set out in my co-pending application No. 840,044 filed July 8, 1969, now U.S. 3,573,277.

The invention will now be further described by way of example with reference to the accompanying drawings in which, FIG. 1 is a block diagram of apparatus for use in treating effluent according to the invention, FIG. 2 is a diagram of an experimental filter bed complex using a particulate filter according to the invention, FIG. 3 shows a simple experimental regeneration cycle, FIGS. 4, 5 and 6, show steps in an alternative "merry-go-round" regeneration system.

Referring to the drawings, a receiving vessel 1, is provided, adapted to receive waste effluents. For example, in a freezing works the effluents may be from a slaughter board drain 2, a casing drain 3, a skin wash drain 4, or paunch washing drain 5. However, it is to be understood that in practice, it may be necessary or desirable to treat departmental wastes separately. From the receiving vessel 1, the washings or effluent are passed through a mechanical pre-treatment section 6 where, for example, the treatment merely consists of passing the material through a 60 mesh sieve, the sieve being provided with suitable means whereby the collected material may be removed, either continuously or from time to time. Alternatively, on a larger scale a rotary vacuum filter could be used. Following mechanical treatment, the effluent passes to a filter bed 7 in which the filter bed comprises a particulate resin material capable of taking up at least the major portion of protein and fat remaining in the effluent. After such treatment, we have found it preferable that the effluent be further treated by a fibrous resin in a scavengerbed 8. Following this, the effluent may pass either directly through conduit 9, to a waste discharge station, or may be passed through a percolating filter or bone char filter 10 whereupon the outgoing effluent from conduit 11 leading from filter 10 may be chlorinated and re-used.

Both the filter bed 7 and scavenger bed 8 may be backwashed when desired to dislodge solid matter from the resins. The backwash waters may be also conducted to the filter 10 by means of conduits 12, 13 and 14. During the regeneration of the resin in the filter bed 7, the effluent containing the released protein may be collected through conduit 15. Similarly, during regeneration of the fibrous resin in the scavenger bed 8, released protein may be collected through conduit 17. Waste liquors which do not need to go through the filter 10 may be withdrawn from the filter bed 7 and scavenger bed 8 through conduits 16 and 9 respectively.

Referring now to FIG. 2, the equipment shown in the block diagram of FIG. 1 under reference 7, may take the shape of a series of tanks 18 to 25, the first group 18–21 being connected in series, and the second group 22–25 being also connected in series, the first group supplying an output 26, the second group supplying an output at 27, and both groups leading to beds of fibrous resin. The two groups of tanks are supplied from a supply tank 28, which may be the pretreatment tank 6 shown in FIG. 1 (or may be an alternative tank), through leads 29, 30 and 31. Tanks may be of any suitable size, for example, for experimental purposes, these tanks have been made in four inch diameter glass columns, and the settled heights of resin have been about 12 inches high in each tank. The flow rate in this case, is approximately eight gallons per hour, and the dead volume in each tank, about one gallon per tank. For a pilot plant, the tanks could be approximately three feet in diameter and ten feet high, holding a total quantity of approximately one ton of resin. For a full scale plant, an input of 1 million gallons per day, which indicates the size of beds required, would be equivalent to a bed seventy feet in diameter, and five feet deep. Of course, the area of the bed could be spread over several tanks. These figures are based on ion exchangers described in my co-pending application No. 840,044, filed July 8, 1969, now U.S. 3,573,277, using the very simplest form of operation.

In view of the fact that the effluent contains a wide range of proteins with different iso electric points, it may not be possible to take up the protein and fat material in an ion exchange bed in a single state with acceptable efficiency. Accordingly, a more complete taking up of protein from the effluent may be obtained by passing the effluent through two types of bed in series one in the hydroxide form, and the other in acid form. Various arrangements have been used experimentally. For example, an arrangement has been used wherein bed 18 was in the acid condition, beds 19 to 21 in the basic form, beds 22 to 24 in the acid form, and bed 25 in the basic form.

In FIG. 3, a simple regeneration system is shown, in which the beds shown diagrammatically at 32, comprise granular beds in acid form, the beds 33 granular beds in basic form, and beds 34 comprises further beds in which there is a resin in fibrous or sponge form, these forming a scavenging filter. The fibrous form of resin may be, for example, diethyl aminoethyl cellulose, or carboxy methyl cellulose, which are particularly useful for removing protein and fat which may break through the particulate resin beds as they approach complete exhaustion. It would not be practicable to apply the raw effluent directly to the scavenging filter, in view of the large amounts of colloidal or suspended matter which is present in the raw effluent, and which would result in rapid clogging of the scavenging filter. It is to be understood that when the beds 32 to 34 are in use, the beds 35, 36 and 37 correspond with the beds 32 to 34, are being regenerated, regeneration being effected by treating the ion exchange material with a solution which may consist of a solution of acid or alkali or mineral salt or a mixture of these. During the regeneration process, the protein removed from the beds as a relatively concentrated solution. When regeneration is complete, i.e. when the application of a further amount of regenerant solution produces no significant quantities of protein, the bed is washed with water to remove excess regenerant solution, and the bed is then ready for a further cycle of effluent purification. The process consists generally, of alternating cycles of effluent penetration and regeneration of the resin bed. The period of time during which effluent is passed through a bed or series of beds before regeneration is started, depends on the purpose of the treatment of the effluent. If the purpose of the treatment is to achieve the maximum uptake of protein from the effluent, then for a given weight of resin, it is necessary that the capacity of the resin should be as nearly as possible completely exhausted. Under these conditions, protein will leak or break through the bed or beds in increasing amounts as the bed or beds become more and more nearly exhausted, so that a proportion of the resultant effluent will still contain considerable proportions of protein. On the other hand, if the main purpose is to purify the effluent, then passing of effluent through the beds will be discontinued sooner and the extent to which the capacity is exhausted, will be decided on by economic and other factors since, of course, it is not possible to completely free the effluent of protein under normal commercial working.

We have found that even after the use of a fibrous scavenger there is some protein left in the effluent, and in addition, there is some odor due possibly to amines resulting from degradation of the protein. These may be reduced by using the percolating filter or bone char, activated carbon or coke filter 10 referred to in connection with FIG. 1.

In relation to regeneration, a "merry-go-round" regeneration cycle may be used as shown in FIGS. 4 to 6. In this arrangement, three sets of filters 8, 39 and 40 are of particulate or granular form, and two sets of filters 41 and 42 are of the fibrous form. In FIG. 4, the input 43 is led into granular filters at 38, the effluent therefrom passing to the granular filter set 39, and then through the fibrous filters 41 to the output 44. In the meantime, granular filters 40 and fibrous filters 42 are being regenerated. In FIG. 5, the granular filter set 39 receives its input from conduit 45, the effluent is passed to granular filter set 30, then to fibrous filter set 32, to the output 46. In the meantime, granular filters 38 and fibrous filters 41 are regenerating. In FIG. 6, in the third step of the merry-go-round cycle, the granular filter set 40 receives input from the conduit 46, the effluent then passing to granular filters 38, and the effluent then passing to fibrous filters 41; granular filters 39 and fibrous filters 42 are regenerating during this part of the cycle. This arrangement has the advantage that a newly regenerated filter bed is the second in a series of two filter beds, the first in the set being a filter bed which has previously been used for purification, and accordingly, its take up capacity is utilised to the best advantage.

Because the regenerant after it has passed through the beds would itself constitute a pollutant and because it contains valuable protein and fat, it is preferably treated so that protein and fat may be recovered for use in, for example, animal nutrition. Furthermore, the water from which the protein and fat has been removed, may also be passed to waste, but it is believed that this water will have been purified sufficiently, to enable the water to be reused for certain rough cleansing purposes, for example, hide washing.

A large proportion of the protein may be precipitated from the regenerant solution by adjustment of the pH value, and subsequent coagulation by heating the solution. The coagulated denatured protein may be separated by filtration, and may then be oven dried. For example, two pounds of exhausted resin bed material, washed with one gallon of a sodium hydroxide solution (2 lbs. NaOH to 100 lbs. water) for 60 minutes; after neutralisation, heating, filtration, and drying may yield approximately 100 gms. of dry protein. In experiments conducted on growing chickens, using the recovered protein and fat, good results and food conversion were obtained using the dry effluent product, and consequently it has been established that the effluent product constitutes a valuable product for poultry feeds. The dried effluent product is a high quality protein from the nutritional point of view.

Experiments were carried out using an effluent consisting of skin washings, on the input and output to each set of columns shown in FIG. 2, i.e. the set consisting of a single acid form ($SO_4$ form) column and three basic form (OH form) columns and the alternative set consisting of three acid form columns and a single basic form column. Measurements of the BOD (Biological Oxygen Demand), of the input and output and estimation of the solids recovery from the two sets of columns showed that the single acid-three basic form set gave a lower recovery of solids and a higher output BOD than the three acid-single basic form arrangement. The three acid-single basic form set gave a yield of 57 gms. recovered solids, while the single acid-three basic form set gave a corresponding yield of 35 gms.

Further experiments were carried out to show the effect of the addition of a fibrous scavenging bed using "Saveall effluent," i.e. effluent which is a sample of all the effluent from a freezing works, in which a set of four granular beds arranged in three acid to one basic form were followed by a scavenging filter in the OH form. It was shown that the addition of a scavenging filter kept the BOD below 100 p.p.m. during the passage of thirty eight gallons of Saveall effluent, and a protein assay showed that very little protein had gone to waste.

I claim:
1. A process for the purification of waste effluents containing protein, which effluents have been subjected to pre-treatment for at least partly removing solids and fat, said process comprising the steps of:
   (a) passing the said effluent through a bed of a particulate ion exchange material in the form of a cross-linked regenerated cellulose modified by the introduction of cationic or anionic exchange groups, said regenerated cellulose being cross-linked with aldehyde residues, which ion exchange material is capable of taking up at least the major portion of the remaining protein from the effluent, and
   (b) subsequently regenerating the ion exchange material for use in a further cycle.

2. A process as claimed in claim 1 wherein said regenerated cellulose is cross-linked with formaldehyde residues.

References Cited
UNITED STATES PATENTS

| | | | |
|---|---|---|---|
| 2,446,913 | 8/1948 | Erlich | 260—112 X |
| 2,992,215 | 7/1961 | Bullock et al. | 210—37 X |
| 3,122,456 | 2/1964 | Meier et al. | 210—37 X |
| 3,409,605 | 11/1968 | Florini | 260—112 |

SAMIH N. ZAHARNA, Primary Examiner

U.S. Cl. X.R.

210—30; 260—112